(12) United States Patent
Hennemann et al.

(10) Patent No.: US 6,926,113 B2
(45) Date of Patent: Aug. 9, 2005

(54) CUSHIONED STEERING FOR ARTICULATED VEHICLE

(75) Inventors: Matthew J. Hennemann, Burlington, IA (US); David R. Natzke, Fargo, ND (US); Donnell L. Dunn, Fargo, ND (US); Roger D. Mickelson, West Burlington, IA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/690,907

(22) Filed: Oct. 22, 2003

(65) Prior Publication Data

US 2005/0087386 A1 Apr. 28, 2005

(51) Int. Cl.⁷ .............................................. B62D 13/00
(52) U.S. Cl. ..................... 180/418; 180/417; 60/422
(58) Field of Search ............................... 280/400, 418, 280/420; 60/420–422, 450, 452

(56) References Cited

U.S. PATENT DOCUMENTS

| 4,070,857 | A | * | 1/1978 | Wible ........................... 60/422 |
| 4,099,733 | A | * | 7/1978 | Ahonen ...................... 280/400 |
| 4,479,349 | A | * | 10/1984 | Westveer ...................... 60/420 |
| 4,546,847 | A | * | 10/1985 | Abels .......................... 180/307 |
| 5,117,935 | A | * | 6/1992 | Hall ............................. 180/235 |
| 5,322,103 | A | * | 6/1994 | Hudson ................... 144/24.13 |
| 5,446,979 | A | * | 9/1995 | Sugiyama et al. ............. 37/348 |

* cited by examiner

Primary Examiner—Lesley D. Morris
(74) Attorney, Agent, or Firm—John William Stader

(57) ABSTRACT

An articulated wheel loader provides a cushioned deceleration at the limits of its turning to the left and to the right by reducing fluid flow through a hydraulic steering cylinder as the articulated frames approach abutment. The throttled fluid flow causes a variable displacement pump to de-stroke, which further cushions the deceleration.

18 Claims, 5 Drawing Sheets

CUSHIONED STEERING FOR ARTICULATED VEHICLE

FIELD OF THE INVENTION

The invention relates generally to construction vehicles. More particularly it relates to articulated construction vehicles, such as wheel loaders.

BACKGROUND OF THE INVENTION

Wheel loaders are generally vehicles with a work implement such as a loader or bucket on the front that can be raised and lowered to scoop up, carry and drop particulate material. They are called "wheel" loaders since they are supported on large steerable wheels. Many wheel loaders are articulated vehicles that steer by "bending" the frame and not by turning the wheels, front and/or rear, with respect to the frame. Articulated wheel loaders do not have a single frame to which the front and rear wheels are mounted, but have at least two sub-frames that are coupled together to pivot or articulate with respect to each other about a generally vertical axis. Hydraulic steering cylinders are positioned between the sub-frames to extend and retract to bend the articulated vehicle. An articulated wheel loader may also include more than one sub-frame, and sub-frames may be able to pivot with respect to each other about additional axes.

Wheel loaders, like skid-steer loaders and loader-backhoes, have a typical mode of operation. These loader vehicles commonly travel in a "Y" path. The loader vehicle advances in a first direction, scoops up a portion of material, then backs up while turning hard to the right (or left). The loader vehicle then moves forward while turning hard to the left (or right), then straightens the wheels out to travel straight forward to a second location where the work vehicle deposits the material, either in a pile or into another vehicle. The work vehicle then backs up while turning hard to the left (or right), then goes forward while turning hard to the right (or left), then straightens up to follow the reverse path back to the first location. The two locations are typically separated only by a short distance on a single construction site.

This back-and-forth motion between two locations that are quite close to one another, with several hard turns to the right and to the left, place significant forces on an articulated wheel loader. The operator must repeatedly and rapidly turn from lock-to-lock during each loading/unloading cycle. In a typical workday, and operator may repeat this turning process a few hundred times.

As one might expect, these repeated and extreme turns place a significant strain on an articulated vehicle as the steering cylinders reach the end of their travel and the front and rear frames of the vehicle bang against each other.

Therefore, what is needed is an improved articulated construction vehicle, such as a wheel loader, that reduces the shock load on the vehicle when the vehicle is turned to the extreme left and extreme right. It is an object of this invention to provide an improved steering cylinder for an articulated vehicle.

SUMMARY OF THE INVENTION

In accordance with a first aspect of the invention, an articulated work vehicle is provided with a hydraulic steering actuator that decelerates the pivoting of the articulated frame as the frame approaches its extreme steering limits.

The work vehicle also has a variable displacement pump that responds to the deceleration by reducing the displacement of the pump.

In accordance with a second aspect of the invention, an articulated wheel loader has steering actuator that decelerates the two frames as they approach their turning limits by throttling fluid flow.

In accordance with a third aspect of the invention, a wheel loader is provided having a first frame, a second frame disposed behind the first frame and pivotally coupled thereto to pivot about a substantially vertical axis with respect to the first frame; an engine fixed to one of the first or second frames; at least one hydraulic pump coupled to and driven by the engine; at least one hydraulic actuator fluidly coupled to the hydraulic pump and mechanically coupled to and between the first and second frames to pivot the frames about the vertical axis, wherein the at least one actuator is configured to increase the effective steering pressure to an elevated level when the first and second frames are within five degrees of mechanical abutment. In accordance with a third aspect of the invention, a wheel loader is provided having a first frame, a second frame disposed behind the first frame and pivotally coupled thereto to pivot about a substantially vertical axis with respect to the first frame; an engine fixed to one of the first and second frames; a hydraulic pump coupled to and driven by the engine; at least one hydraulic actuator fluidly coupled to the hydraulic pump and mechanically coupled to and between the first and second frames to pivot the frames about the vertical axis, wherein the at least one actuator is configured to increase the effective steering pressure to an elevated level when the first and second frames are within five degrees of mechanical abutment.

BRIEF DESCRIPTION OF THE DRAWINGS

The present invention will be more fully understood from the following detailed description taken in conjunction with the accompanying drawings, wherein like reference numerals refer to like parts.

FIG. 3A shows a free flow position; FIG. 3B shows a middle position with flow partially reduced; and FIG. 3C shows a third position in which substantially all fluid flow is through a bypass orifice;

DETAILED DESCRIPTION OF THE PREFERRED EMBODIMENTS

Figure 1:
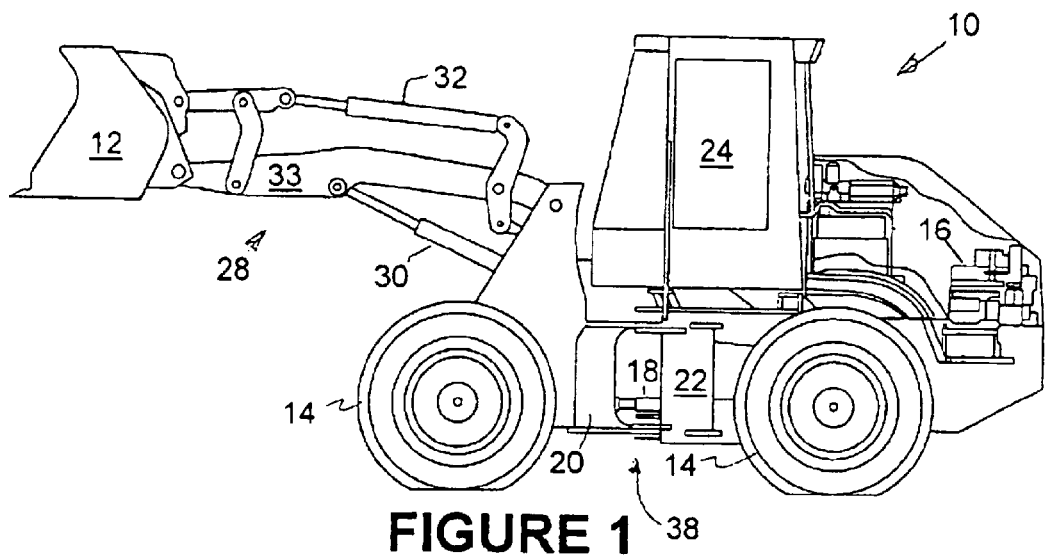
FIG. 1 is a side view of a wheel loader in accordance with the present invention.

FIG. 1 illustrates a side view of an articulated work vehicle, such as a wheel loader 10 with a work implement, such as a bucket 12 in a partially lifted position.

Wheel loader 10 includes four wheels 14 of which the left two wheels are shown in FIG. 1. The left two wheels support the vehicle on the left hand side. Two identical wheels are similarly arranged in a fore-and-aft relation and extend from the right hand side of the vehicle. All four wheels are driven by engine 16 and support the vehicle as it travels over the ground.

The driveshaft 18 extends between a front frame 20 and rear frame 22. The driveshaft 18 transmits power from engine 16 to the front wheels of the vehicle which are mounted on the front frame 20. The engine also drives the rear wheels of the vehicle which are mounted on the rear frame 22. A transmission (not shown) is coupled between the engine and the wheels to provide for multiple gear reductions.

An operator's compartment or cab 24 is disposed on one of the frame portions and is shown on top of rear frame 22. A pair of lift cylinders 30 is shown coupled to the lift arm 33 to raise and lower the lift arm. The operator can raise and lower bucket 12, which is coupled to the lift arm by bucket linkage 28, by manipulating suitable controls (not shown) in the operator's compartment. The operator can raise the bucket by extending cylinders 30 and tilt the bucket by extending or retracting cylinders 32. An identically arranged cylinder and bucket linkage (not inview) is provided on the right side of the vehicle and is connected to the right side of the bucket.

The steering system includes two steering cylinders 34 and 36 (only one cylinder is visible in FIG. 1). The steering cylinders are coupled to and between the front frame 20 and the rear frame 22. These cylinders steer the vehicle by pivoting the front and rear frames with respect to each other. The operator steers the vehicle by turning a steering wheel 150 in the operator compartment (FIGS. 4 and 5), which causes a steering control circuit to pivot the frames with respect to each other.

Figure 2:
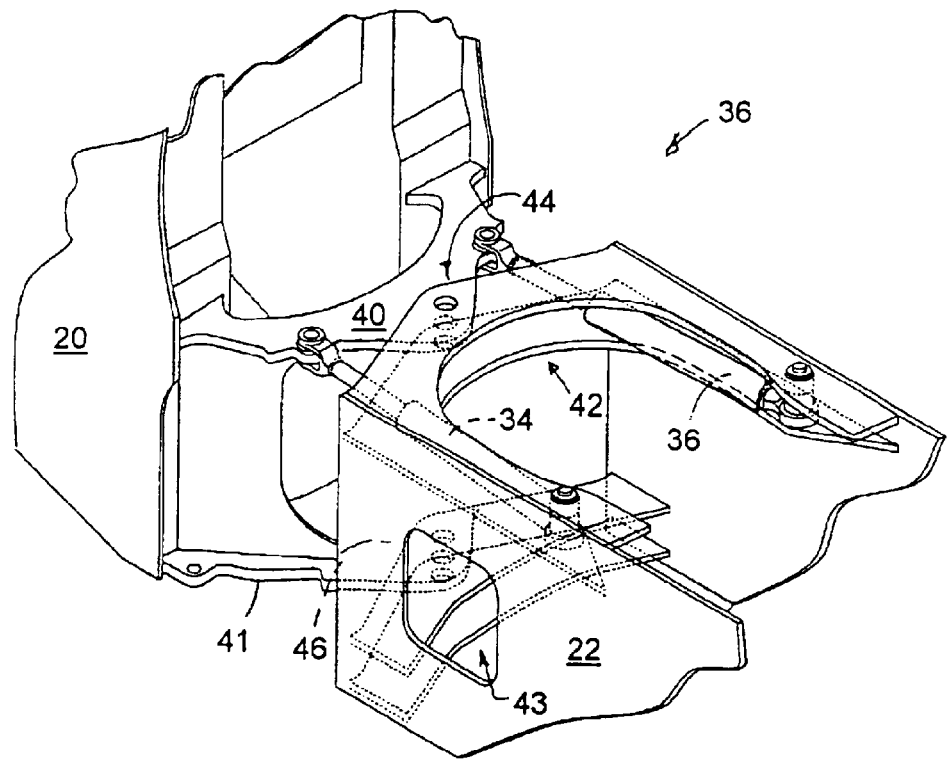
FIG. 2 is a perspective view of the articulation joint that pivotaily couples the front frame to the rear frame.

FIG. 2 is a perspective view of the articulation joint or steering linkage 38 which couples the front frame 20 to the rear frame 22. The articulation joint 38 permits the two frames to pivot with respect to each other about a substantially vertical axis. Front frame 20 has elongate flanges 40 and 41 that extend rearward with respect to front frame 20. Rear frame 22 has a generally mating pair of elongate flanges 42 and 43 that extend forward with respect to rear frame 22. Flanges 40 and 42 and 41 and 43 are pivotally coupled together by an articulation pin (not shown) or a pair of coaxial articulation pins (also not shown) that extend co-axially through the holes 44 in flanges 40 and 42 and through the holes 46 in flanges 41 and 43. The co-axial holes and pins define the substantially vertical articulation axis about which the front and rear frames pivot with respect to each other.

Steering cylinder 34 (the left cylinder) is mounted between the front frame 20 and the rear frame 22 on the left side of the vehicle. When steering cylinder 34 is extended, it forces the left portions of the front 20 and rear 22 frames to move apart. The frames are constrained to pivot about the articulation axis with respect to each other. Thus, the front frame 20 pivots to the right with respect to the rear frame 22. Similarly, when steering cylinder 34 retracts, it pulls the left portions of front 20 and rear 22 frames together, causing the vehicle to steer to the left.

Similarly, steering cylinder 36 (the right cylinder) is mounted between the front frame 20 and the rear frame 22 on the right side of the vehicle. When steering cylinder 36 extends, it forces the right hand portions of the front 20 and rear 22 frames to move apart. This causes the front frame 20 to pivot to the left with respect to the rear frame 22. Similarly, when steering cylinder 36 retracts, it pulls the right hand side of the frames together, causing the vehicle to steer to the right.

Two hydraulic fluid conduits 152 and 154 (see FIGS. 4 and 5) are cross-connected between the extend port and retract port of steering cylinder 34, and between the retract port and extend port of steering cylinder 36, to cause the synchronized and simultaneous extension and retraction of steering cylinders 34 and 36. When left hand cylinder 34 extends, right hand cylinder 36 retracts, and when right hand cylinder 36 retracts, left hand cylinder 34 extends.

While the front and rear frames are free to pivot with respect to each other, they clearly have limits of travel—the points at which the frames mechanically collide when turned to the extreme left and to the extreme right.

In traditional wheel loaders, the only structure preventing the two frames from banging against each other at the extreme limits of their travel, are rubber bumpers mounted on one or the other (or both) frames. These rubber bumpers are positioned such that they are between the portions of the front and rear frame metal that would otherwise collide in metal-to-metal contact.

Unfortunately, the rubber bumpers of these prior art vehicles only provide a limited amount of travel when they are compressed. When the frames are pivoted at full speed, they are stopped quite suddenly in the time it takes the rubber bumpers to compress only an eighth or quarter of an inch. At full speed, the frames are pivoting with respect to each other at about 25 degrees per second. The rubber bumpers not only experience an extremely high impact, but they also stop the pivoting within a fraction of a second and a fraction of a degree.

This is an extremely short distance, given that the frames might be pivoting at 25 degrees per second with respect to each other. As a result, the operator experiences sharp jarring whenever he steers the vehicle to the extreme left limit or the extreme right limit.

Figure 3A:
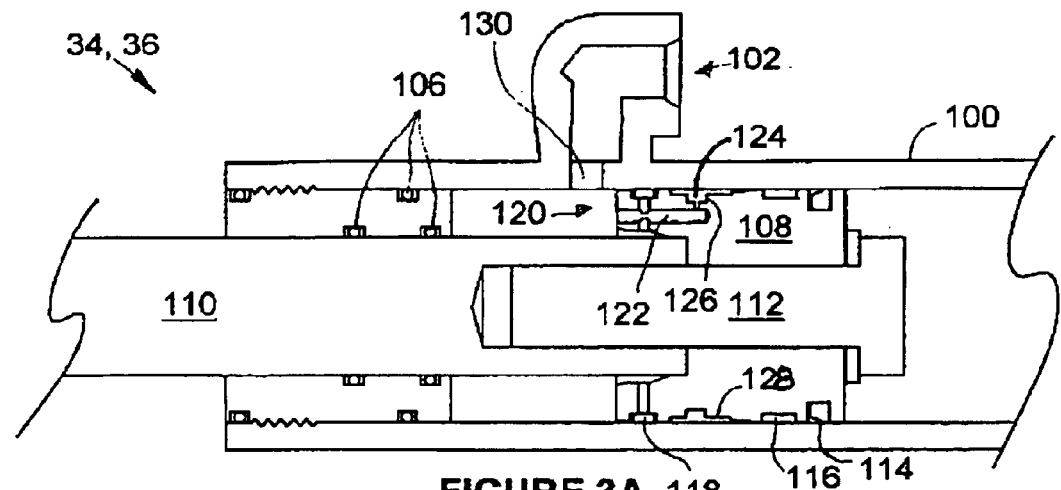
FIGS. 3A–3C are cross-sectional views of a steering cylinder according to the present invention for the wheel loader of FIGS. 1 and 2 showing the cylinder in three different configurations.
Figure 3B:
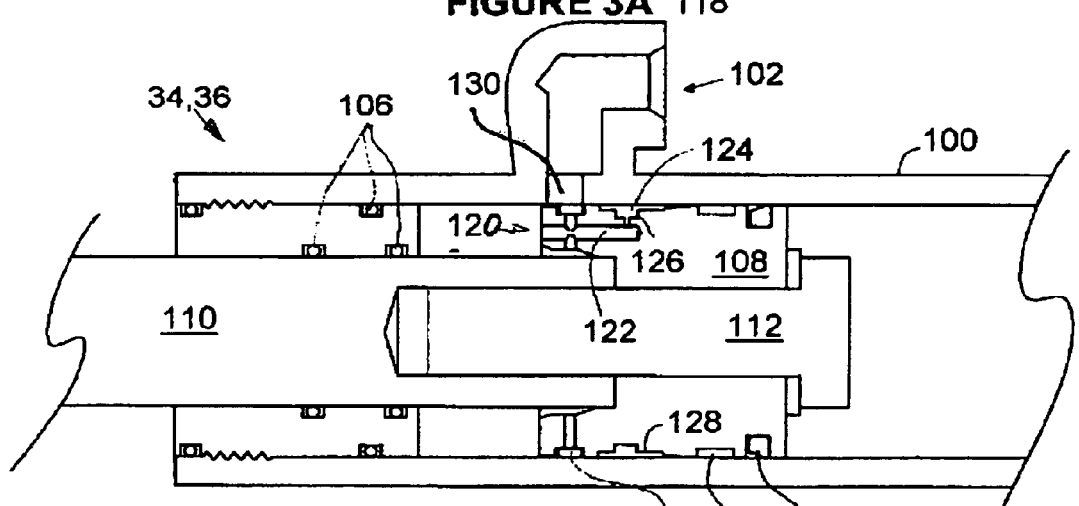
Figure 3C:
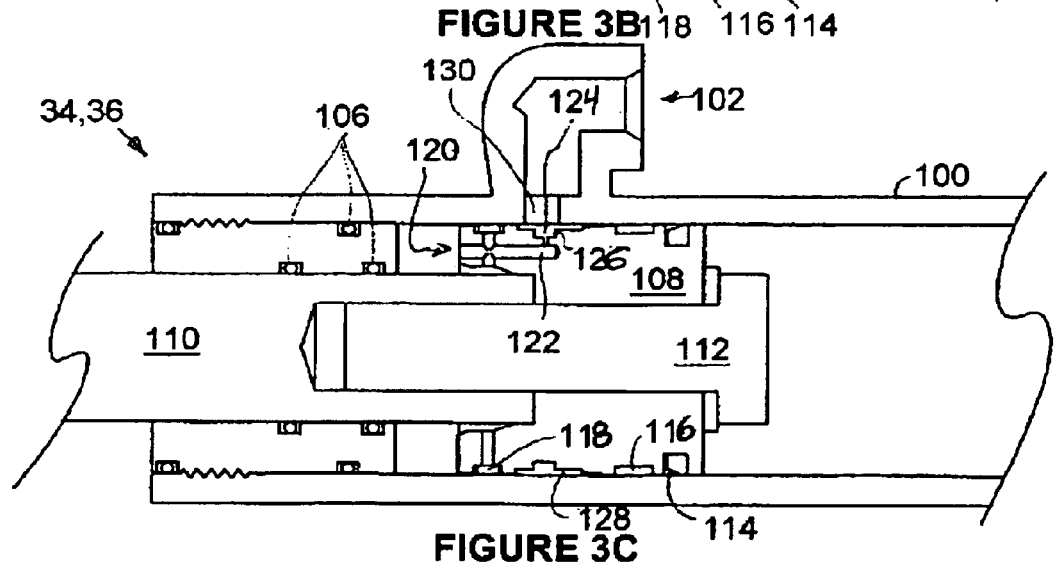

FIGS. 3A–3C illustrates three different cross-sectional views of each of steering cylinders 34 and 36. The first of these, FIG. 3A, shows steering cylinder 34 and 36, nearing its extreme extended position. As mentioned above, when the front frame reaches its extreme rightward position, the left hand steering cylinder 34 becomes almost fully extended. Similarly, when the front frame reaches its extreme leftward position, the right hand steering cylinder 36 becomes almost fully extended.

Thus, the left hand steering cylinder 34 is in the positions illustrated in FIGS. 3A–3C as the wheel loader approaches its extreme right turn position when the rubber bumper is engaged. The right hand steering cylinder 36 is in the positions illustrated in FIGS. 3A–3C as the wheel loader approaches its extreme left turn position when the rubber bumper on the opposite side of the vehicle will be engaged.

Steering cylinders 34 and 36 shown in FIG. 3 include a cylinder body 100 in which there are two ports, an extend port (not shown) and a retract port 102. When fluid fills the cylinder through the retract port, the rod is retracted within the cylinder. When fluid fills the cylinder through the extend port, the rod is extended from the cylinder. In FIG. 3, only the retract port is shown.

A gland nut 104 is threaded into the rod end of cylinder 100. Sealing rings 106 extends around the circumference of gland nut 104 and is disposed in a circumferential groove therein.

A piston 108 is fixed to the free end of rod 110 by a bolt 112. This bolt passes through a hole in piston 108 and threadedly engages the end of rod 110 thereby securing the piston to the rod.

Piston 108 includes seal 114, which extends circumferentially around the periphery of the piston and is disposed in a circumferential groove in the piston. A wear ring 116 is provided that extends circumferentially around the periphery of piston 108 and is disposed in a circumferential groove in the piston. This wear ring is disposed between the piston and the cylinder and serves as a barrier to prevent the piston from contacting the cylinder.

A cast-iron cushioning ring 118 is provided that extends circumferentially around the piston and is disposed in a circumferential groove in the piston. Ring 118 is preferably disposed adjacent to the rod end of the cylinder.

A fluid flow path 120 is provided in piston 108 to conduct fluid from the rod end of the cylinder into the retract port 102 when the retract port is covered by a portion of piston 108.

Fluid flow path 120 includes a hole 122 in the end face of the piston facing the rod end of the cylinder. Hole 122 extends generally parallel to the longitudinal axis of the piston and the rod.

Path 120 also includes a throttling passageway or orifice 124 that extends radially from hole 122 to an outer surface of piston 108 and intersects hole 122. Path 120 also includes a circumferential groove 126 that extends about the periphery of the piston. Orifice 124 opens into the bottom of groove 126. Path 120 also includes a second circumferential groove 128 that also extends around the outer surface of the piston. Groove 128 is shallower and wider than groove 126. Groove 126 is formed in the bottom of groove 128.

The foregoing features constitute fluid flow path 120. Their function is to collectively conduct fluid from the rod end of the cylinder through the piston to an outer surface of the piston, bypassing cushion ring 118. Of course path 120 could be differently configured. Different holes at different locations with different sizes are all acceptable. The grooves may be replaced with holes, and vice versa. What is important is that the fluid flow provided by path 120 continues to provide a small flow whenever hole 130 in the cylinder wall is otherwise blocked by the piston.

FIGS. 3A–3C illustrates the identical cylinder in three different positions. FIG. 3A shows the position of the cylinder when fluid is permitted to freely flow out of retract port 102. Fluid is permitted to flow freely out of the cylinder over substantially all of its piston travel as shown here. In this position, hydraulic fluid inside the rod end of the cylinder is permitted to flow without restriction through retract port 102. This is the standard flow path of the cylinder. The fluid flow path is relatively large and fluid is permitted to freely flow from the cylinder through hole 130 in the cylinder wall and out the retract port 102.

In the preferred embodiment, the flow path directly out of the cylinder is substantially larger than the flow path provided by path 120. As a comparison, hole 130 of retract port 102 has a diameter of 5/8 of an inch. The orifice diameter is about 1/10 this size. The area of hole 130 in the cylinder wall is therefore roughly 100 times as large as the area of the orifice 124.

When the piston is in the position shown in FIG. 3A, flow proceeds freely out of the cylinder through hole 130. In FIG. 3B, the rod has been extended slightly more and the piston has begun to cover up hole 130. This begins to restrict flow out of retract port 102. As a result, the fluid pressure in the rod end of the cylinder begins to rise. This pressure rise is not significant, however, until the hole 130 is substantially entirely covered by cushion ring 118. Even when the hole 130 is entirely covered, the piston does not come into a complete halt in the cylinder and flow out of the rod end of the cylinder does not cease entirely. The reason for this is the parallel flow path 120.

In FIG. 3C, hole 130 has been entirely closed to direct flow out of the cylinder. Nonetheless, flow path 120 in FIG. 3C provides an independent and parallel path of fluid flow out of the rod end of the cylinder. By the time hole 130 is completely covered by the piston as in FIG. 3, fluid flow is only able to escape the rod end of the cylinder through path 120. Due to the restriction of orifice 124, very little hydraulic fluid can leave.

As a result, when the piston is in the position shown in FIG. 3C, the pressure begins to increase dramatically in the cylinder. This increased rod end pressure slows the piston down. By itself, it can cushion the impact of the two frames 20, 22 by increasing the rod end pressure and thereby slowing the piston down.

A second synergistic effect contributes to this cushioning; this slowing down of cylinder movement shortly before full stroke, and that is the de-stroking of the pump providing hydraulic fluid to the steering cylinders. This effect is explained in more detail in conjunction with FIG. 4 which shows the entire steering circuit and FIGS. 5–7 that show subcomponents of the steering circuit in more detail.

Figure 4:
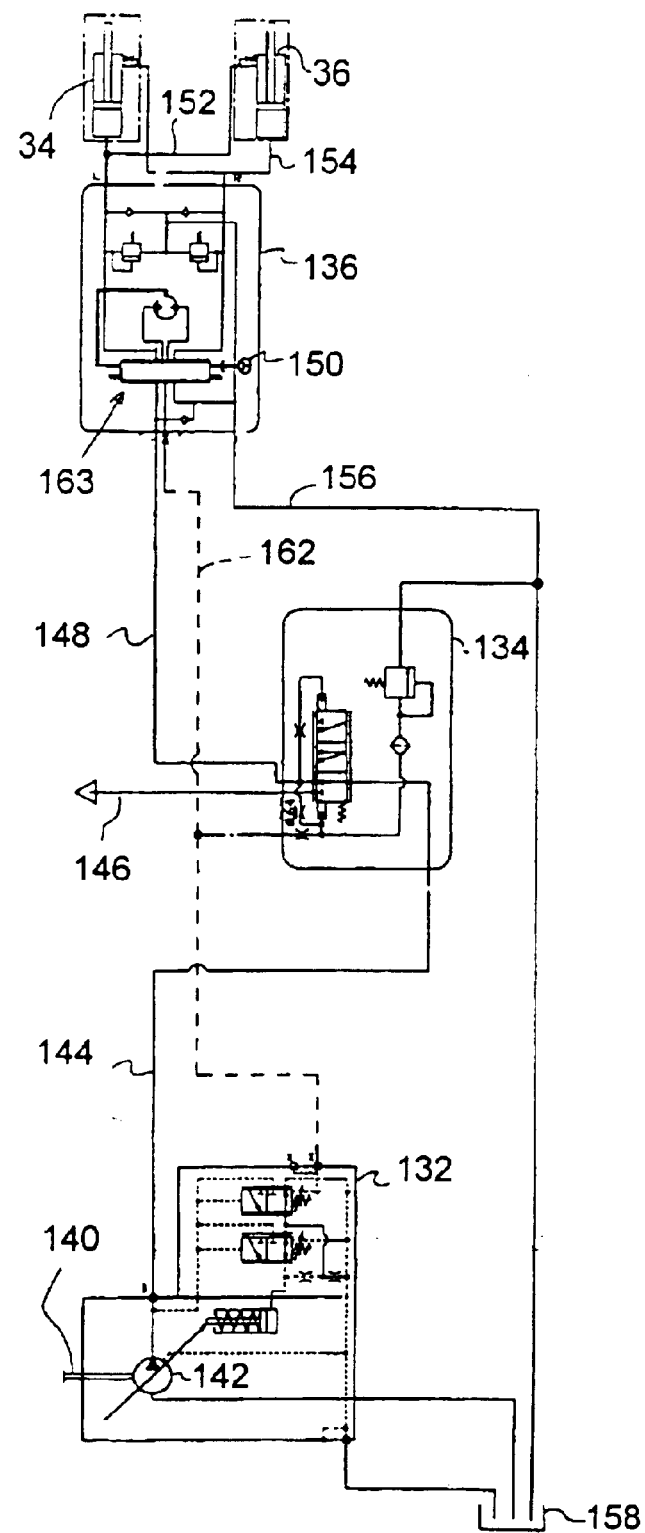
FIG. 4 is an overall view of the hydraulic steering control circuitry of the vehicle showing a hydraulic fluid source, a priority circuit, an ORBITROL circuit that meters hydraulic fluid flow to the steering cylinders; and the steering cylinders themselves.

FIG. 4 illustrates the hydraulic circuit including the two steering cylinders 34 and 36. There are four main components of the steering system. First, the system includes a hydraulic fluid source 132 (also FIG. 6) that provides hydraulic fluid to the two cylinders. The second component is the priority circuit 134 (also FIG. 7) which regulates flow between the steering cylinders and the other hydraulic components of the vehicle. The third portion of the system is the ORBITROL circuit 136 (also FIG. 5) which meters a predetermined volume of fluid into the steering cylinders based upon the motion of the wheel loader's steering wheel 150. The fourth component is the steering cylinders 34, 36 themselves, which receive fluid from the ORBITROL circuit and, in response, turns the frames with respect to each other.

The hydraulic fluid source 132 is typically driven by rotating shaft 140 which is driven by the engine 16 of the vehicle. The source 132 includes a variable displacement pump 142 (see also FIG. 6). The pump provides hydraulic fluid under pressure to conduit 144. Pressurized hydraulic fluid in conduit 144 is directed by the conduit from source 132 to priority circuit 134. Priority circuit 134 determines how much hydraulic fluid the ORBITROL circuit 136 needs and distributes fluid to the steering circuit in preference to all other hydraulic fluid needs.

Typically, when the operator is not steering the vehicle, very little fluid is required for the ORBITROL circuit or steering cylinders 34 and 36. The cylinders are relatively stationary as the vehicle travels down the field, and little or no fluid is used. When the vehicle is not turned by the operator, no fluid is needed.

Priority circuit 134 is responsive to the fluctuating demand and selectively directs hydraulic fluid to conduit 146 when the steering demand is low. Conduit 146 supplies fluid to other complements of the system such as the implements. If the steering circuit needs fluid, the priority circuit reduces the amount of fluid going to conduit 146 and increases the fluid to conduit 148 which supplies hydraulic fluid under pressure to the ORBITROL circuit.

The priority circuit is configured such that whenever the ORBITROL circuit 136 needs hydraulic fluid flow, the ORBITROL circuit gets that flow even at the expense of other components in the hydraulic system.

Hydraulic fluid under pressure is conducted through conduit 148 to ORBITROL circuit 136. ORBITROL circuit 136 is also coupled to steering wheel 150. This wheel is the wheel in the operator's compartment that the operator turns to steer the vehicle to the left or right.

Depending upon the direction and degree of turning, ORBITROL circuit 136 is configured to conduct hydraulic fluid under pressure to either the extend port of the left hand cylinder 34 and the retract port of right band cylinder 36 through conduit 152 or to direct hydraulic fluid under pressure to the retract port of cylinder 34 and the extend port of cylinder 36 through conduit 154.

If one conduit 152, 154 receives hydraulic fluid under pressure from the ORBITROL circuit, the ORBITROL circuit connects the other conduit 154, 152 through conduit 156 and back to hydraulic fluid tank 158. Hydraulic fluid tank 158 serves as the source of low pressure hydraulic fluid for hydraulic fluid source 132. Source 132 draws fluid from tank 158 through conduit 160, pressurizes it and inserts it back into the circuit.

A signal line 162 is coupled to and between ORBITROL circuit 136, priority circuit 134, and hydraulic fluid source 132. This signal line transmits a hydraulic fluid pressure signal from ORBITROL circuit 136 back to priority circuit 134 and to source 132. This pressure signal signals priority circuit 134 to change the way it allocates hydraulic fluid flow between the steering cylinders and the other hydraulic components of the system.

When fluid pressure drops on hydraulic signal line 162 it indicates to the priority circuit 134 that the ORBITROL circuit 136 may have difficulty moving the steering cylinders 34 and 36. It thereby provides additional hydraulic fluid under pressure to the ORBITROL circuit 136 in an attempt to insure the vehicle can be steered.

At the same time, the dropping pressure signal is also provided to hydraulic source 132 and signals it to increase its output. More particularly, it causes the specific displacement of variable displacement pump 142 inside hydraulic source 132 to increase. As a result, source 132 increases its hydraulic fluid output pressure, counteracting the drop in pressure and tending to maintain the hydraulic fluid pressure constant in the steering system of FIG. 4.

Figure 5:
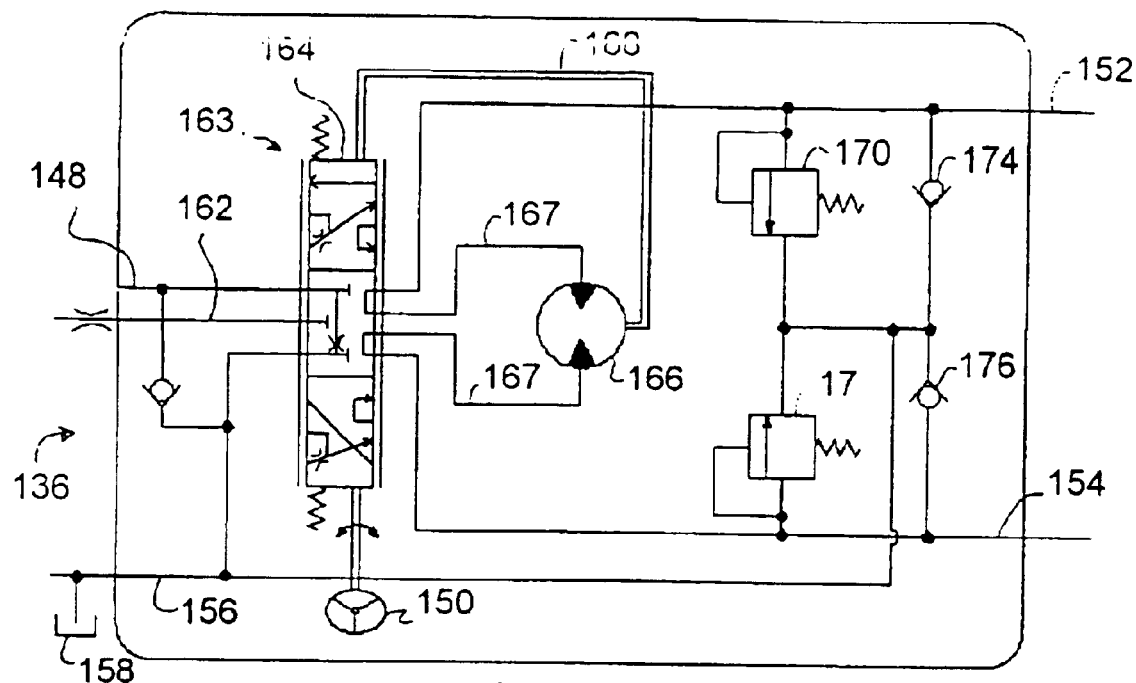
FIG. 5 is a detailed hydraulic circuit schematic of the ORBITROL circuit and cylinders of FIG. 4.

FIG. 5 shows ORBITROL circuit 136 in greater detail. Fluid source 132 provides pressurized hydraulic fluid through conduit 148 to ORBITROL circuit 136. This fluid passes through valve 163. Valve 163 directs the fluid into either conduit 152 or conduit 154.

Valve 163 is actuated by steering wheel 150. When the operator turns the steering wheel to the left, it causes the spool 164 of valve 163 to move downward in FIG. 5 ("Up", and "down" refer only to FIG. 5 and are used for convenience). When the spool moves, it sends fluid to motor 166 through a supply/return conduit 167 in a first flow direction and to the hydraulic cylinders 34, 36 to steer the vehicle in leftward steering direction by conducting pressurized fluid into conduit 154 and fluid in conduit 152 back to tank 158. The ORBITROL circuit also returns fluid from the other supply/return conduit 167 to tank 158 through line 156.

Connecting hydraulic fluid under pressure to the cylinders and the motor by turning the wheel left does two things. First, it drives the motor 166 in a first rotational direction. It also causes right steering cylinder 36 to extend and left steering cylinder 34 to retract. As hydraulic fluid flows through motor 166, the motor turns, thereby rotating driveshaft 168 which is coupled to valve 163. Driveshaft 168 is coupled to valve 163 such that its movement counters that of the steering wheel and moves the spool back to its original, closed-off neutral position: the position shown in FIG. 5.

A turn of wheel 150 to the left will therefore cause hydraulic fluid to extend the right steering cylinder 36 and retract the left cylinder 34 causing the vehicle to turn left. This leftward turning stops when the operator stops turning the wheel and motor 166 moves valve 163 back to its original closed position.

The same process occurs (but in reverse) when the operator turns steering wheel 150 the right. Valve spool 164 moves in the opposite direction, upward in FIG. 5, and the vehicle turns to the right as left steering cylinder 34 extends and right steering cylinder 36 retracts. This is precisely equal and opposite to the left steering described immediately above. The cylinders and hydraulic circuit are configured to provide a preferred steering speed of at least 5 degrees per second, more preferably at least 15 degrees per second, and most preferably at least 20 degrees per second.

Each of conduits 152 and 154 are coupled to tank conduit 156 via overpressure relief valves 170 and 172, respectively, and anti-cavitation valves 174 and 176, respectively. These overpressure and anti-cavitation valves prevent the pressures in conduits 152 and 154 from rising above design limit pressures and also prevent cavitation, which occurs when pressures drop too low.

We described the normal operation of ORBITROL circuit 136 above—the most common mode of operation when the cylinders are in their normal operating range. When the cylinders approach the limits of their range, however, (when flow is restricted in the cylinders by the piston of FIGS. 3A–3C), the steering system functions differently.

When cylinders 34 and 36 approach the mechanical limit of the machine, they are slowed by the valve elements in each of the cylinders before the frames make mechanical contact. These elements were described above in conjunction with FIGS. 3A–3C. As we described there, when the cylinders reach their limits, flow leaving the cylinders is cut off except for a small flow through an orifice in the cylinder. This causes a sharp pressure rise in the cylinder as fluid in the rod end of the cylinder resists further movement. This pressure rise appears as a sudden increase in pressure in whichever of conduits 152 or 154 are providing a pressurized fluid to the cylinders. It is transmitted back through the conduits (either 152 or 154, depending upon which one is supplying fluid under pressure), back through valve 163, and then into signal line 162.

The pulse is quite large. In a typical wheel loader, this pressure pulse is around 3400 or 3500 PSI. And it is these high pressures that cause the hydraulic fluid source 132 to reduce its output to near zero gallons per minute by de-stroking pump 142.

Figure 6:
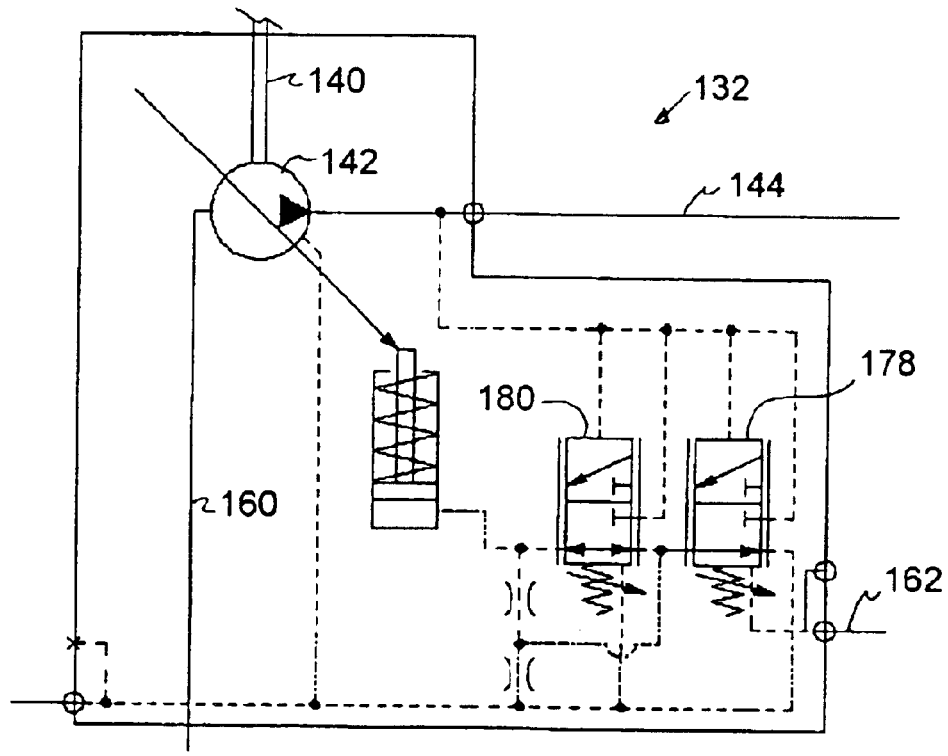
FIG. 6 is a detailed hydraulic circuit schematic of the hydraulic fluid source of FIG. 4.

Referring now to FIG. 6, when the pressure pulse arrives on signal line 162 at hydraulic fluid source 132, it is applied to valves 178 and 180 which function to vary the displacement of the pump. The valve is adjusted so that pump 142 will go from 100% flow capacity at 3400 PSI to near 0% flow capacity at 3500 PSI. When this happens, as shown in FIG. 6, the specific displacement of pump 142 is reduced from 100 percent of displacement to zero percent displacement when the pressure increases in signal line 162 from 3400 to 3500 PSI.

This process of reducing the specific displacement of pump 142 is called "de-stroking". Orifice 124 of cylinders 34 and 36 is sized to generate sufficient back pressure on signal line 162 to de-stroke pump 142 such that the velocity of pistons 108 are gradually reduced. "Gradually" in this context is relative.

Figure 7:
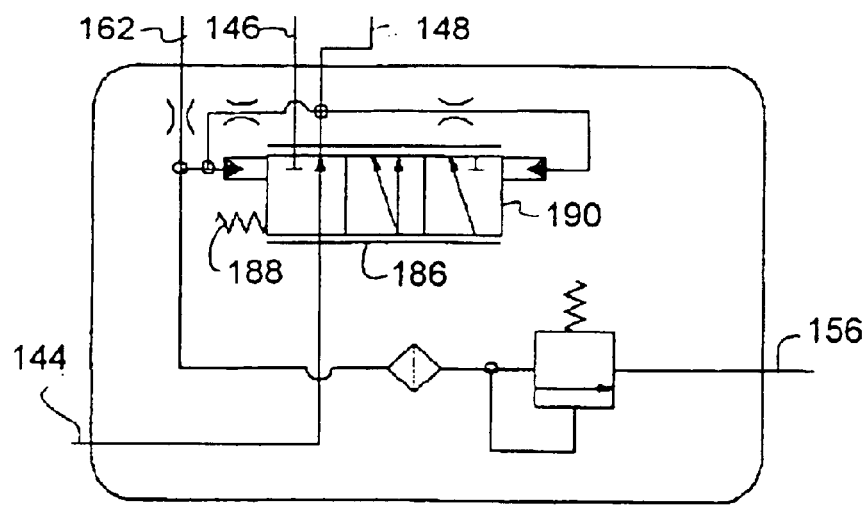
FIG. 7 is a detailed hydraulic circuit schematic of the priority circuit of FIG. 4.

Priority circuit 134 of FIG. 7 is also responsive to the pressure in signal line 162. The core of priority circuit 134 is priority valve 186. Priority valve 186 is actuated by pressure in signal line 162. It is also actuated by pressure at the outlet of the valve, conduit 148. Hydraulic fluid under pressure from source 132 is applied to priority circuit 134 through hydraulic line 144, which is also fluidly coupled to priority valve 186.

When the vehicle is just starting or for any other reason the pressure is low or nonexistent in signal line 162, the valve 186 is in the position shown in FIG. 7. In this position it is biased to the right by spring 188, and all flow is directed through the valve spool 190, into hydraulic conduit 148, and to ORBITROL circuit 136. If the pressure is reasonably high, and the steering circuit is not making a demand on the system, valve 186 shifts to the left, conducting more fluid to the implements connected to conduit 146.

Figure 8:
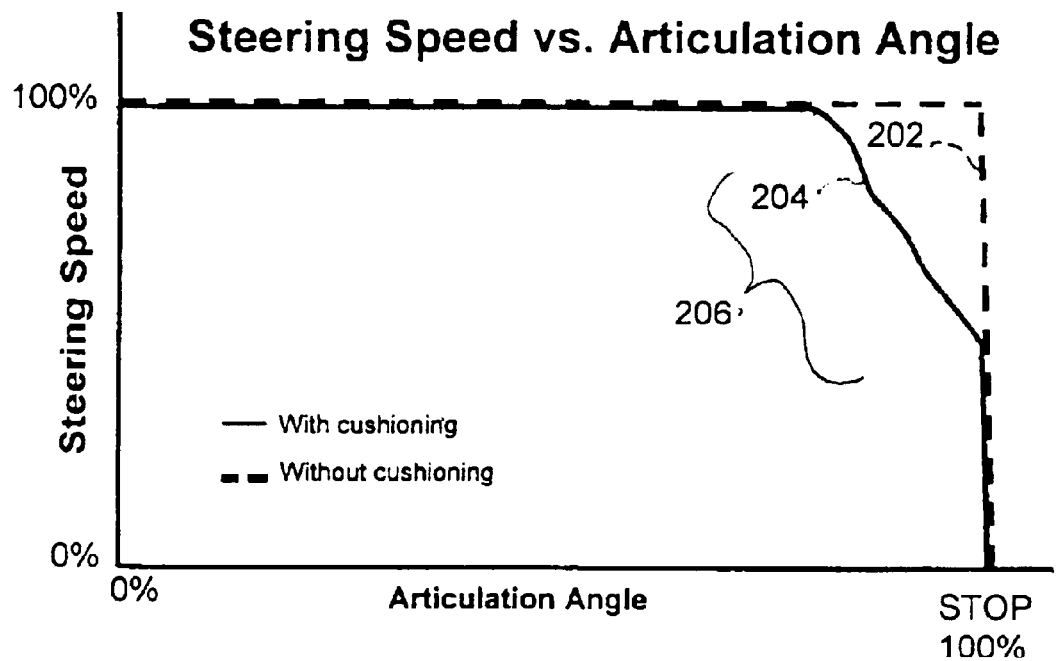
FIG. 8 is a graph of a printer art wheel loader's steering speed versus pivot position and a graph of a steering speed versus pivot position that is provided by the wheel loader using the steering cylinder described herein.

In the present design, once flow is throttled through orifice 124 in cylinders 34 and 36, the cylinder is still permitted to move an additional short distance before the front frame and the rear frame mechanically engage each other and further movement is impossible. To provide optimal cushioning, orifice 124 is selected to raise the hydraulic pressure in signal line 162 to between 3400 and 3500 PSI. Between these two values hydraulic source 132 will reduce the flow rate—the specific displacement of pump 142—from full flow to zero flow. By selecting an orifice with this diameter, pump 142 gradually reduces its specific displacement over a period of a few milliseconds. In response to this reduction in flow rate and specific displacement, the cylinders keep moving as shown in FIG. 8, but at a slower and slower speed. As a result, the pivoting speed of the front frame with respect to the rear frame slowed significantly to about 12.5 degrees per second from a maximum pivoting speed of 25 degrees per second just as the front frame and the rear frame make contact at the extreme limit of their travel. In prior art systems, the two frames turn at full speed with respect to each other and stop after compressing a rubber bumper perhaps 0.125 or 0.250 inches. The shock loads and impact are substantial. The shock loads and impact in the system described herein are substantially reduced.

FIG. 8 illustrates this improvement. There are two traces in FIG. 8, the first, trace 202 illustrates how fast a prior art wheel loader decelerated when the frames contacted each other, the second trace 204 illustrates how slowly of the loader according to the present invention decelerates.

The chart of FIG. 8 plots turning speed in degrees per second vs. turning angle in degrees. In a preferred embodiment of the loader illustrated herein, the front frame can turn about 40 degrees to the left of straight ahead and 40 degrees to the right of straight ahead before mechanically binding. Furthermore, when the operator turns the steering wheel fast, the two frames will turn with respect to each other at a rate of about 25 degrees per second. Thus, it takes about 1½ seconds for the front frame to turn 40 degrees from straight ahead in either direction. Note that both traces show that the vehicle turns at 25 degrees per second through most of its travel. However, in the case of the prior art vehicle, the frames continue turning at that high rate of speed until the frames make a mechanical contact and bang into each other. Turning velocity goes from 25 degrees per second to 0 degrees per second in less than one degree. This corresponds to a time interval at 25 degrees per second of perhaps 100 milliseconds from full speed to full stop. The steering range of the vehicle is preferably at least 40 degrees from lock to lock, more preferably at least 60 degrees, and most preferably at least 70 degrees. The example illustrated herein provides a range of 40 degrees to the left and 40 degrees to the right, for a total lock to lock steering range of 80 degrees.

In contrast to this, note that performance of a system having the features described herein. Cushioning starts at approximately 35 degrees. This is where a knee in trace 204 appears. At about 35 degrees hole 130 in the cylinder of FIG. 3 has been completely closed off and all flow out of the cylinder is throttled through orifice 124. The resistance provided by orifice 124 generates an increased pressure in the hydraulic line (152 or 154, depending) supplying fluid to the head end of the cylinder. This increased pressure is communicated over signal line 162 to hydraulic fluid source 132. It then begins to reduce the stroke—the specific displacement—of pump 142. As the specific displacement decreases, the flow that source 132 sends through high-pressure line 144 and 148 to the cylinders is reduced. This reduction in flow that is sent to the cylinders causes them to move at ever slower speeds. This steadily dropping speed appears in trace 204 in FIG. 8 as angled portion 206. By the time the two frames contact each other at 40 degrees of pivot, the velocity has been reduced to about half of full speed. This significantly reduces the shock to both the vehicle and the operator.

While the embodiments illustrated in the FIGURES and described above are presently preferred, it should be understood that these embodiments are provided by way of example. The invention is not intended to be limited to any particular embodiment, but is intended to extend to various modifications that nevertheless fall within the scope of the appended claims.

We claim:

1. An articulated work vehicle comprising:
   a first frame;
   a second frame disposed longitudinally in line with the first frame and pivotally coupled thereto to pivot about a substantially vertical axis with respect to the first frame;
   an engine fixed to one of the first and second frames;
   at least one hydraulic pump coupled to and driven by the engine to produce hydraulic fluid pressure; and
   at least one hydraulic actuator fluidly coupled to the at least one hydraulic pump and mechanically coupled to and between the first and second frames to pivot the frames about the vertical axis, wherein the at least one actuator is configured to increase a steering pressure to an elevated pressure level when the first and second frames are within five degrees of mechanical abutment.

2. The articulated work vehicle of claim 1, wherein the at least one actuator increases the effective steering pressure by throttling fluid flow leaving the actuator, and further wherein the at least one pump is a variable displacement pump that is responsive to elevated hydraulic pressure provided by the elevated steering pressure.

3. The articulated work vehicle of claim 2, wherein the at least one actuator includes a hydraulic cylinder having a cylinder body slidably containing a piston, the cylinder body having an opening, the opening being disposed to conduct fluid out of the cylinder body as the first and second frames move toward abutment, and further wherein a priority circuit is fluidly coupled between the pump and the cylinder.

4. The articulated work vehicle of claim 2, wherein the actuator is a hydraulic cylinder having a rociprocatable piston and at least two fluid flow paths past the piston and out of the cylinder, wherein the effective steering pressure is increased by blocking or highly restricting at least one of the two fluid flow paths out of the cylinder.

5. The articulated work vehicle of claim 2, wherein the first and second frames are mechanically constrained to pivot through a total angular range of at least 60 degrees.

6. The articulated work vehicle of claim 4, wherein the hydraulic actuator can pivot the frames with respect to each other at a rate of at least 5 degrees per second.

7. A work vehicle, comprising:
a front frame;
a rear frame disposed behind the front frame and pivotally coupled thereto;
an engine fixed to one of the front and rear frames;
a hydraulic pump mechanically coupled to and driven by the engine; and
at least one hydraulic actuator fluidly coupled to the hydraulic pump and mechanically coupled to and between the front and rear frames to pivot the front and rear frames with respect to each other, wherein the at least one actuator is configured to mechanically increase a steering load to an elevated load level when the first and second frames approach mechanical abutment.

8. The work vehicle of claim 7, wherein the at least one actuator is configured to increase the steering load by throttling fluid flow leaving the at least one actuator, and further wherein the pump is a variable displacement pump having a displacement, the pump being responsive to elevated hydraulic pressure produced when the steering load is increased by the throttling of fluid flow.

9. The work vehicle of claim 8, wherein the at least one actuator includes a hydraulic cylinder having a piston disposed in an elongate cylindrical body, the cylindrical body having an opening in a wall thereof, the opening being disposed to conduct hydraulic fluid out of the cylindrical body as the front and rear frames approach abutment.

10. The work vehicle of claim 8, wherein the at least one actuator is a hydraulic cylinder configured to increase the steering load by blocking or highly restricting at least one of at least two parallel fluid flow paths out of the cylinder as the frames approach abutment.

11. The work vehicle of claim 8, wherein the front and rear frames are mechanically constrained to pivot through a total angular range of at least 60 degrees.

12. The work vehicle of claim 10, wherein the at least one actuator can pivot the frames with respect to each other at a rate of at least 5 degrees per second.

13. An articulated work vehicle comprising:
a front frame;
a rear frame disposed behind the front frame and pivotally coupled thereto;
an engine fixed to one of the front and rear frames;
a hydraulic pump mechanically coupled to and driven by the engine; and
at least one hydraulic actuator fluidly coupled to the hydraulic pump and mechanically coupled to and between the front and rear frames to pivot the frames with respect to each other, wherein the at least one actuator is adapted to mechanically increase a steering pressure by throttling fluid flow through the actuator when the front and rear frames are within at least ten degrees of abutting one another.

14. The articulated work vehicle of claim 13, wherein the at least one actuator is configured to increase the steering pressure by throttling fluid flow leaving the at least one actuator, and further wherein the pump is a variable displacement pump having a displacement, the pump being responsive to elevated hydraulic pressure produced when the steering pressure is increased.

15. The articulated work vehicle of claim 13, wherein the at least one actuator includes a hydraulic cylinder having a piston with at least one discrete fluid flow path therethrough and an elongate cylindrical body, the cylindrical body having an opening in a wall thereof adjacent to a rod end of the cylinder, the opening being disposed to conduct fluid out of the cylindrical body as the front and rear frames approach abutment.

16. The articulated work vehicle of claim 15, wherein the at least one actuator is a dual-ported hydraulic cylinder and wherein the steering pressure is increased by limiting fluid flow leaving the cylinder to the at least one discrete fluid flow path.

17. The work vehicle of claim 14, wherein the front and rear frames are mechanically constrained to pivot through a total angular range of at least 60 degrees.

18. The work vehicle of claim 17, wherein the at least one actuator can pivot the frames with respect to each other at a rate of at least 5 degrees per second.

* * * * *